US005608005A

United States Patent [19]

Sojka

[11] Patent Number: 5,608,005
[45] Date of Patent: Mar. 4, 1997

[54] PROCESS FOR VISCOSIFYING WATER WITH CARBOXYLIC ACID MONOMERS POLYMERIZED IN SILICONE SOLVENTS

[75] Inventor: Milan F. Sojka, Algonquin, Ill.

[73] Assignee: AMCOL International Corporation, Arlington Heights, Ill.

[21] Appl. No.: 504,999

[22] Filed: Jul. 20, 1995

Related U.S. Application Data

[62] Division of Ser. No. 327,580, Oct. 24, 1994, abandoned.

[51] Int. Cl.$^6$ .............................. C08L 31/00; C08F 2/00
[52] U.S. Cl. .......................................... 524/556; 526/194
[58] Field of Search .............................. 526/194; 524/556

[56] References Cited

U.S. PATENT DOCUMENTS

| | | | |
|---|---|---|---|
| 3,915,921 | 10/1975 | Schlatzer, Jr. | 260/17.4 |
| 4,509,949 | 4/1985 | Huang et al. | 586/558 |
| 4,675,426 | 6/1987 | Crivello | 526/194 |
| 4,709,767 | 12/1987 | Alexander | 175/65 |
| 4,794,140 | 12/1988 | Alexander | 524/827 |
| 5,189,102 | 2/1993 | Tsubuko et al. | 525/112 |
| 5,288,814 | 2/1994 | Long, II et al. | 525/450 |
| 5,336,740 | 8/1994 | Eian | 526/194 |

FOREIGN PATENT DOCUMENTS

| | | |
|---|---|---|
| 0206072A2 | 12/1986 | European Pat. Off. . |
| 0301532A2 | 2/1989 | European Pat. Off. . |
| 0371421A2 | 6/1990 | European Pat. Off. . |
| 1024451 | 6/1983 | U.S.S.R. .............................. 526/194 |

OTHER PUBLICATIONS

Lochhead et al., Encyclopedia of Polymers and Thickeners in Cosmetics, *Cosmetics and Toiletries*, vol. 108, May 1993 at pp. 95–138.

Yoshikazu et al., "New Emulsion System—Polymeric Water in Water Emulsion," *Contemp. Topics in Polymer Sci.*, 14 575–586 (1984).

Davidson et al., "Microrheology of Thickened Suspensions," *J. Colloid and Interface Science*, vol. 55, 163–169 (1975).

BF Goodrich Product Description "Carbopol® Water Soluble Resins," pp. 1–35.

DuPont Product Brochure, "VAZO® Polymerization Initiators, Uses, Storage and Handling," pp. 1–16 (Jul. 1984).

Dow Corning Product Brochure, "Information About Dow Corning Silicone Fluids," 200® Fluid, 0.65cs and 200® Fluid, 1.0cs, (1993).

Dow Corning Product Brochure, "Information About Dow Corning Silicone Fluids," 200® Fluid, 1.5cs; 200® Fluid, 2.0cs; and 200® Fluid, 5.0cs, (1993).

Hüls America Inc. Product Brochure on Silicones, at pp. 16, 270, 271, 274, 275, and 298.

Dow Corning Product Brochure, "Information About Volatile Silicone Fluids," Dow Corning® 244, 245, 344, and 345, and 345 Fluids, 200® Fluid (0.65cs) from Dow Corning Corporation (1993).

*Primary Examiner*—Joseph L. Schofer
*Assistant Examiner*—N. Sarofim
*Attorney, Agent, or Firm*—Marshall, O'Toole, Gerstein, Murray & Borun

[57] ABSTRACT

The present invention is directed to an improved process for producing a viscosifying polymer. The process of the present invention comprises the steps of copolymerizing a carboxylic acid monomer and a polyfunctional cross-linker monomer in an effective mole ratio in a silicone solvent under an inert atmosphere in the presence of an effective amount of an initiator to form a viscosifying polymer that in a 0.5% by weight aqueous mucilage exhibits a viscosity of about 50,000 to 300,000 cps. The present invention is further directed to a viscosifying copolymer comprising a cross-linked copolymer of a carboxylic acid monomer and a polyfunctional cross-linker monomer, the viscosifying copolymer characterized in that a 0.5% by weight aqueous mucilage of the viscosifying copolymer exhibits a viscosity of about 50,000 to 300,000 cps. A preferred viscosifying copolymer includes acrylic acid as the carboxylic acid monomer and allyl methacrylate monomer as the polyfunctional cross-linker.

23 Claims, No Drawings

PROCESS FOR VISCOSIFYING WATER WITH CARBOXYLIC ACID MONOMERS POLYMERIZED IN SILICONE SOLVENTS

CROSS REFERENCE TO RELATED APPLICATION

This application is a divisional of U.S. application Ser. No. 08/327,580 filed Oct. 24, 1994, now abandoned.

BACKGROUND OF THE INVENTION a. Field of the Invention

The present invention is directed to an improved process for producing a viscosifying carboxylic acid copolymer. The polymer produced by the process of the present invention has a viscosity that is equal to or greater than 50,000 centipoise ("cps") when measured in water at a 0.5% by weight concentration. The process of the present invention is useful because it is capable of producing a high viscosity copolymer that is suited for use in foods, cosmetics, printing inks, pastes, and coating applications.

b. Background

Numerous processes are known in the art for producing viscosifying polymers. However, each of these processes suffers from one or more infirmities. For example, EPO Publication No. 0 371 421 A2, which was published on Jun. 6, 1990, discloses a process for producing a polycarbophyl or cross-linked polyacrylic acid polymer in a solvent selected from acetone, alkyl acetates, and mixtures thereof. In particular, the '421 publication discloses only a single polymer having a viscosity for a 1% solution that exceeded a 50,000 cps at pH 7.2 to 7.8 at 20 rpm. One problem with the '421 process is that it uses the organic solvent ethylacetate, or acetone, either of which is flammable, hazardous, and requires special handling provisions. A second problem with the process of the '421 disclosure is that the best polymer that was capable of being produced by the disclosed process only had a viscosity of 59,200 cps for a 1% solution.

U.S. Pat. No. 3,915,921, which issued to Schlatzer on Oct. 28, 1975, discloses a viscosifying polymer that is produced by copolymerizing a carboxylic acid monomer and one or more alkyl acrylate esters. The '921 patent, like the previously discussed '421 patent, discloses copolymerization that occurs in an organic solvent such as benzene, xylene, tetralin, heptane, hexane, carbon tetrachloride, methylchloride, ethylchloride, bromotrichloromethane, dimethylcarbonate, diethylcarbonate, ethylenedichloride, and mixtures thereof. Thus, a problem with the '921 process, like that of the '421 process, is that it utilizes hydrocarbon solvents, which are flammable and in many instances hazardous to health, while the halocarbon solvents are generally just hazardous. Polymerization in any one of the disclosed solvents can give rise to hazardous and/or flammable vapor emissions, which require special precautions. A second problem with the process disclosed in the '921 patent is that the best viscosity that was reported for any polymer at the 0.5% by weight concentration in water was 71,200 cps.

U.S. Pat. No. 4,509,949 to Huang, which issued on Apr. 9, 1985, discloses a process for producing water thickening agents consisting of copolymers of acrylic acids and esters that are cross-linked with a poly-functional vinylidene monomer containing at least two terminal $CH_2$ groups. One problem with the '949 process, like most of the processes of the prior art, is that the '949 process also teaches polymerization in a generally hazardous solvent such as "benzene, tetralin, hexane, heptane, cyclohexane, carbontetrachloride, chloroform, trichloroethylene, methylchloride, ethylchloride, and methylenechloride; chlorofluoroalkanes, such as chlorofluoromethane and chlorofluoroethane, each containing at least four halogen atoms; esters such as methylacetate and ethylacetate, alcohols including methanol, ethanol, butanol and the like." ['949 at col. 4, lns. 37–44.] Another problem with the '949 process is that it is only capable of producing polymers that at best provide modest increases in viscosity. For example, the best viscosity that was produced by the products of the '949 process was 12,000 cps for a 1.2% by weight solution of the polymer. ['949 at col. 8, ln. 8.]

In view of the problems commonly associated with the '421, '921 and '949 patents, it is a first object of the present invention to produce a viscosifying polymer in a non-hazardous and a non-flammable solvent that generally does not require special handing. In addition, it is an object of the present invention that the polymer produced by the process of the present invention have a viscosity of at least 50,000 cps when measured as a 0.5% by weight solution in water at room temperature.

One method for producing a viscosifying polymer that does not use hydrocarbon or halocarbon solvents is disclosed in EPO Publication No. 0 301 532 A2, which was published on Feb. 1, 1989. The '532 disclosure teaches that copolymerization can be effected in carbon dioxide to yield a fluffy powder when the acrylic acid, the comonomer, and the chemical initiator are dissolved in a single liquid phase, i.e., liquid carbon dioxide. The best viscosity that was obtained with the product produced by the '532 process was 12,550 cps for 0.2 weight % solution in water. One problem with the '532 process is that the carbon dioxide must be pressurized in order to form a liquid at the reaction temperatures. In particular, pressures of 1200 to 2500 pounds per square inch would not be uncommon. Such pressurized reactions require special reaction vessels and equipment. An object of the present invention is to provide a process for producing a viscosifying polymer that is capable of utilizing a conventional unpressurized reactor.

A second problem with the '532 process is that it produces a product having a low viscosity (12,550 cps for a 0.2 weight % solution). To overcome such low viscosities, an object of the present invention is to provide a process that produces a viscosifying copolymer that exhibits a viscosity of 50,000 cps or greater in a 0.5% by weight aqueous solution.

SUMMARY OF THE INVENTION

The present invention has two aspects. In its first aspect, it is directed to an improved process for producing a viscosifying polymer. The improved process of the present invention comprising the steps of copolymerizing carboxylic acid monomer and a polyfunctional cross-linker monomer in a mole ratio of about 1:0.03 to 1:0.10, respectively, in a silicone solvent, under an inert atmosphere in the presence of an effective amount of an initiator to form a viscosifying polymer that a 0.5% by weight aqueous mucilage provides a viscosity of about 50,000 to 300,000 cps. A preferred initiator for the process of the present invention is a redox system.

In its second aspect, the present invention is directed to a viscosifying copolymer comprising a cross-linked copolymer of carboxylic acid monomer and a polyfunctional cross-linker monomer in a mole ratio of about 1:0.03 to 1:0.10, respectively. The viscosifying copolymer of the present invention is characterized in that a 0.5% by weight aqueous solution of the viscosifying copolymer has a viscosity of about 50,000 to about 300,000 cps, preferably about 100,000 to 300,000 cps, and more preferably, about 200,000 to about 300,000 cps.

DETAILED DESCRIPTION OF THE INVENTION

The present invention has multiple aspects. In its first aspect, the present invention is directed to an improved process for producing a viscosifying polymer. The process of the present invention comprises the steps of:

polymerizing a carboxylic acid monomer and a polyfunctional cross-linker monomer in a mole ratio of about 1:0.03 to 1:0.10, respectively, in a silicone solvent under an inert atmosphere in the presence of an effective amount of initiator to form a viscosifying polymer characterized, by being capable of producing a 0.5% by weight aqueous mucilage that has a viscosity of about 50,000 to 300,000 cps. All viscosities referenced herein are measured on a Brookfield Viscometer using ASTM E-2196 at 1 RPM.

Where the carboxylic acid monomer is acrylic acid and the crosslinker monomer is a bifunctional cross-linker such as allyl methacrylate, the effective mole ratio between the acrylic acid and the allyl methacrylate is 1:0.03 to 1:0.10. As the functionality of the cross-linker monomer increases, from bifunctionality to trifunctionality, tetrafunctionality and multifunctionality, the amount of cross-linker monomer that is needed to provide an "effective mole ratio" decreases due to the increasing equivalency of each molecule of cross-linker.

The process of the present invention utilizes a carboxylic acid monomer, i.e., a carboxylic acid having at least one unsaturated carbon-carbon double bond. A preferred carboxylic acid monomer is "acrylic acid." By the term "acrylic acid" as used herein, is meant acrylic acid and its homologs, such as methacrylic acid, ethacrylic acid, itaconic acids, maleic acids and their respective anhydrides.

The process of the present invention utilizes a polyfunctional crosslinker monomer, i.e., a monomer having at least two unsaturated carbon-carbon double bonds, each of which is capable of polymerizing independently of the other. Typical cross-linker monomers are bifunctional, trifunctional or tetrafunctional monomers. Representative bifunctional monomers include allyl methacrylate, allyl acrylate, dimethyldiallyl ether, divinyl benzene, bisphenol A dimethacrylate, divinyl glycol and ethylene glycol dimethacrylate. Typical trifunctional cross-linkers include triallyl isocyanurate, triallylcyanurate, trimethylolpropane triacrylate, trimethylol propane and trimethacrylate. Typical tetrafunctional cross-linker monomers include tetramethylolmethane tetraacrylate, tetramethylolmethane tetramethacrylate and tetravinyl silane. Typical polyfunctional cross-linker monomers include allyl pentaerythritol, trimethylolpropane diallyl ether and allyl sucrose.

In the improved process of the present invention, the copolymerization is achieved under an inert atmosphere. Typically, the inert atmosphere is provided by bubbling or flushing nitrogen, carbon dioxide or argon into the reaction mixture. Although other non-reactive gases may be used, the preferred inert gases are nitrogen and/or argon.

The polymerization of the improved process of the present invention is performed in a silicone solvent. As shown in Example 4, herein, polymerizations that are performed in accordance with the present invention in a silicone solvent, are capable of producing a viscosifying copolymer that has a significantly greater viscosity than that produced by the identical reaction running a hydrocarbon solvent such as ethylacetate. Typical silicone solvents for use in the improved process of the present invention are the cyclomethicones, the linear polydimethylsiloxanes, the aromatic phenyl containing siloxanes, the polymethylalkyl siloxanes and the fluorosilicones, which are commercially available from a variety of sources, including Dow Corning, Midland. Mich. General Electric Company, Walker and Goldschmidt, Hüls, or Petrarch.

By way of example, the cyclomethicone solvents which are within the scope of the process of the present invention include hexamethylcyclotrisiloxane, octamethylcyclotetrasiloxane, decamethylcyclopentasiloxane, dodecamethylcyclohexasiloxane and mixtures thereof.

By way of further example, the linear polydimethyl siloxane solvents, which are useful in the process of the present invention, are of the formula: $(CH_3)SiO[SiO(CH_3)_2]_xSi(CH_3)_3$ wherein $x=0.65-2,500,000$, and includes hexamethyl disiloxane (i.e., $x=0$), octamethyl trisiloxane (i.e., $x=1$), decamethyl tetrasiloxane (i.e., $x=2$), dodecamethyl pentasiloxane (i.e., $x=3$), etc. and mixtures thereof. The linear polydimethyl siloxane solvents that are used in the process of the present invention are typically non-volatile with boiling points over 192° C., and are represented by the above formula wherein $x=1.5-2,500,000$. More typically, the linear polydimethyl siloxane solvents that are used in the process of the present invention are of the above formula wherein $x=1.5-100$; most typically, $x=1.5-10$.

The aromatic phenyl containing siloxane include the diphenyl dimethyl siloxane copolymers and the phenylmethyl siloxane polymers which are of the Formulas I and II below, respectively:

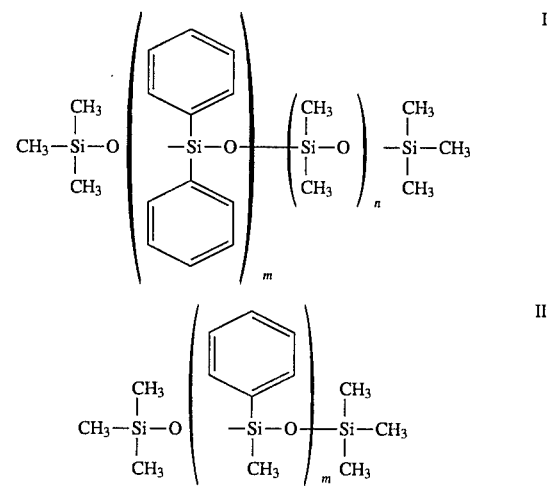

wherein "m" and "n" may be the same or different and are an integer from 1–100. Most typically, "m" and "n" are separately an integer from 1–10. Other aromatic phenyl containing siloxanes include 1,1,5,5-tetraphenyl-1,3,3,5-tetramethyltrisiloxane, and 1,1,3,5.5-pentaphenyl-1,3,5-trimethyl trisiloxane.

The polymethylalkyl siloxane solvents are of the formula:

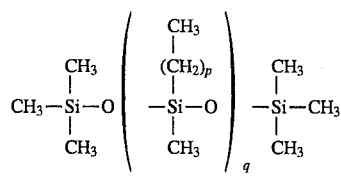

wherein p and q are integers from 1–100 and 1–30 respectively.

Typical fluorosilicones are the polyfluoroalkyl methyl siloxanes, which are of the formula:

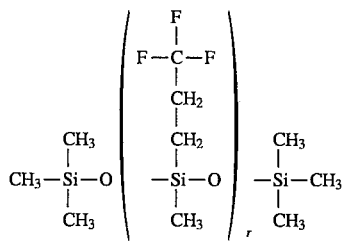

wherein r is an integer from 1–100.

It is also within the scope of the improved process of the present invention that the silicone solvent includes mixtures of one or more of the silicone solvents disclosed herein.

The process of the present invention also utilizes an effective amount of an initiator. By the phrase "an effective amount of an initiator" is meant the amount of initiator that is effective to produce a viscosifying polymer that at 0.5% mucilage is capable of providing a viscosity of at least 50,000 cps as measured using ASTM E-2196 at 1 RPM. To determine an effective amount of initiator, one of ordinary skill in the art would begin with a small amount of initiator and then increase the amount of initiator until the desired degree of polymerization and cross-linking was obtained. Typically, a effective amount of initiator is from about 0.01 mole percent to 5 mole percent, wherein by the term "mole percent" is meant the percentage of a particular reactant relative to all reactants as measured in moles.

Initiators that are suitable for use in the present invention are of the peroxide, azo, amino or nitrile type. Suitable initiators of the peroxide type include the organic peroxides, such as t-butyl hydroperoxide, cumene hydroperoxide and dibenzoyl peroxide. The organic peroxides are commercially available from sources such as Aztec Peroxides Inc., Elyria, Ohio. Suitable inorganic peroxide initiators include hydrogen peroxide, the water-soluble peracids, and their salts. The water-soluble per-acid salts include the alkali-metal or ammonium persulfates, perphosphates, perborates, perchlorates, percarbonates, and the like, such as sodium or potassium perphosphate, potassium percarbonate, sodium perchlorate, sodium perborate, ammonium perborate and the like.

The organic peroxycarbonates and -dicarbonates are also useful as initiators in the present invention. Suitable peroxycarbonates and -dicarbonates include the following: t-butylperoxy 2-ethylhexyl carbonate; di(4-t-butylcyclohexyl) peroxydicarbonate, dimyristyl peroxydicarbonate; and dicetyl peroxydicarbonate, all of which are commercially available in an aqueous suspension from Aztec Peroxides, Inc., Elyria, Ohio.

Other polymerization initiators that are capable of being used in the present invention are the easily decomposable organic "azo" compounds, such as 2,2'-azobis(2-methylpropanamidine)dihydrochloride; 2,2'-azobisisobutyronitrile; 2,2'-azobis(2,4-dimethylpentanenitrile); 2,2'-azobis(2-methylbutanenitrile); 1,1'-azobis(cyclohexanecarbon and 2,2'-azobis(isobutyronitrile). Many of the azo compounds are available from DuPont, Wilmington, Del. under the VAZO® tradename.

A particularly preferred polymerization initiator for use in the process of the present invention is a redox couple/multiple system. A "redox couple/multiple system" is a combination of one or more oxidizing agents and one or more reducing agents that generate transient free radicals during the course of the redox reaction. In many instances, the oxidizing agent is an inorganic or organic peroxide. The reducing agent is any one or more of a variety of reducing agents, alone or in combination with one or more activators. For example, when the oxidizing is hydrogen peroxide and the reducing agent is $Fe^{+2}$ (a redox couple system) suitable activators include ammonia, aliphatic amines, $Na_2S_2O_3$, thiourea, ascorbic acid, glyoxal, sodium nitrite or hydroxylamine.

When the oxidizing agent is an organic peroxide, suitable reducing agents include sulfonic acids, α-ketals, formic acid, thiols, and tertiary amines alone or in combination with a soluble metal ion enhancing agent (i.e., salts of Pb, Fe, Co, Ni, Mn, Cu, Zn, or Ce) and/or an activator, such as $NaHSO_3$ mercaptans, diphenylthiourea, ascorbic acid, and the azobisnitriles.

A preferred redox couple/multiple system is a mixture of a peroxide and an azo compound. Preferably, the peroxide and the azo compound are present in the mixture in a 1:1 mole ratio. A particularly preferred redox couple/multiple system for use in the present invention is the combination of dibenzoyl peroxide and 2,2'-azobis(2,4-dimethylpentanenitrile) at about a 1:1 mole ratio. Regardless of the initiator selected, the process of the present invention requires an effective amount of an initiator to form the viscosifying polymer.

The Applicant has unexpectedly found that when allyl methacrylate is the polyvalent cross-linker monomer in the process of the present invention, a viscosifying polymer is produced that is characterized by its ability to produce high viscosities even in 0.5% by weight mucilages. As reflected in Example 5, when a molar equivalent of allyl methacrylate cross-linker is used in the process of the present invention, a 0.5% mucilage of the resulting copolymer has a viscosity of 143,000 cps whereas, when allyl acrylate is substituted for allyl methacrylate in the process of the present invention, a 0.5% mucilage of the resulting copolymer in an aqueous solution is only capable of producing a viscosity of 27,500 cps.

In the process of the present invention the mole ratio of acrylic acid to allyl methacrylate is about 1:0.03 to 1:0.1, respectively. Preferably, the mole ratio of acrylic acid to allyl methacrylate is 1:0.03 to 1:0.09, respectively. This is reflected in Table II of Example 5, wherein when lauroyl peroxide was the initiator, a mole ratio of acrylic acid to allyl methacrylate in the range of 1:0.03 to 1:0.09 produced a viscosifying copolymer that was characterized by a viscosity of at least 72,000 cps, i.e., within the range of 72,000 cps to 143,000 cps.

A more preferred mole rate ratio of acrylic acid to allyl methacrylate is 1:0.06 to 1:0.08, respectively.

The process of the present invention is capable of producing viscosifying polymer that is characterized by its ability to produce highly viscous solutions even when present in low concentrations. In particular, the process of the present invention produces a viscosifying copolymer that at 0.5% by weight in water provides a mucilage having a viscosity of about 50,000 to 300,000 cps; preferably, about 100,000 to 300,000 cps; more preferably, about 200,000 to 300,000 cps.

Thus, in its second aspect, the present invention is also directed to a viscosifying copolymer comprising a cross-linked copolymer of a carboxylic acid (such as monomer acrylic acid) and a polyfunctional cross-linker monomer (such as allyl methacrylate) wherein the carboxylic acid monomer and the polyfunctional cross-linker monomer are present at a mole ratio of about 1:0.03 to 1:0.10, respectively, and a 0.50% mucilage of the viscosifying copolymer is capable of providing a viscosity of about 50,000 cps to 300,000 cps. Preferably, the viscosity of a 0.5% by weight solution of the viscosifying copolymer is about 100,000 cps to 300,000 cps; more preferably, about 200,000 cps to 300,000 cps.

In the viscosifying Copolymer of the present invention, the preferred mole ratio of acrylic acid to allyl methacrylate is about 1:0.06 to 1:0.08.

EXAMPLE 1

Into a 2000 ml three neck flask equipped with a stirrer, thermometer, and condenser was added 324.00 grams of Dow Corning®244, i.e., octamethylcyclotetrasiloxane, and the siloxane was purged with argon. In a beaker, and during an argon gas purge of the silicone solvent, 36.00 grams of acrylic acid were pre-neutralized with 0.518 grams of anhydrous potassium carbonate by mixing potassium carbonate in acrylic acid until the potassium carbonate dissolved which took about one-quarter of an hour. To the beaker was added 0.44 grams allyl methacrylate cross-linker, and 0.144 grams lauroyl peroxide and the mixture was stirred for five minutes. The contents of the beaker were then poured into the reactor containing the Dow Corning® 244 and stirred at 100 rpm until it became clear, which took about one-half of an hour. With the inert purge continuing at the top of the reactor, heating was commenced at room temperature, T 22° C. When the reaction mixture was about 44° C. the first spot of a polymer was detected visually, and heating was continued to 70° C., whereupon the external heating was discontinued and the exothermic reaction was allowed to proceed on its own. At 78° C., the entire contents of the reaction flask became slightly hazy. At 85° C., the contents were white in color. The exothermic reaction attained a maximum temperature of 122° C. After cessation of the exotherm, the system was allowed to cool to 90° C. at which time mild heating was employed, and a temperature of 90° C. was maintained for five hours. The polymer was recovered from the reaction flask and filtered to remove remaining silicone solvent. The polymer was then dried in an oven for twelve hours at 60° C. The dry polymer was particulate and free-flowing with an average aggregate particle size of 20 microns and the viscosity of a 0.5% by weight mucilage as measured on a Brookfield viscometer, using ASTM E-2196, was 143,000 cps at pH 7, 1 RPM. When measured at 1 RPM and 0.5 RPM, the yield value of viscosity was 379.

EXAMPLE 2

The polymers of Example 2 were prepared according to the process of Example 1 with the exception that the initiator of Example 1 was replaced by the various initiators of Example 2.

Example 2 demonstrates the use of different chemical initiators: t-butyl peroctoate, Vazo 52, Vazo 64, redox dibenzoyl peroxide/Vazo 52, and dibenzoyl peroxide, in the process of the present invention. The copolymers produced showed significant differences in thickening efficiency. The abbreviations used in Tables I and II are identified as follows:

AMA—allyl methacrylate
ALA—allyl acrylate
DVB—divinyl benzene
BADM—bisphenol A dimethacrylate
EGDM—ethylene glycol dimethacrylate
DVG—divinyl glycol
TMPTMA—trimethylolpropane trimethacrylate
TVS—tetravinyl silane
t-BPO—t-butyl peroctoate
DBP—dibenzoyl peroxide
Vazo 52—2,2'-azobis(2,4-dimethylpentanenitrile)
Vazo 64—2,2'-(2-methylpropanenitrile)
APE—allyl pentaerythritol
TMPDAE—trimethylolpropane diallylether

TABLE I

| Monomer | Cross-linker | | Initiator | | Mucilage Viscosity (cps) |
|---|---|---|---|---|---|
| AA WT % | Type | Mole % | Type | Mole % | 0.5% |
| 10 | AMA | 0.07 | t-BPO | 0.05 | 101,000 |
| 10 | AMA | 0.07 | Vazo 52 | 0.02 | 51,000 |
| 10 | AMA | 0.07 | Vazo 64 | 0.03 | 48,000 |
| 10 | AMA | 0.07 | DBP/Vazo 52 | 0.015/0.015 | 244,000 |
| 10 | AMA | 0.07 | DBP | 0.045 | 100,300 |

EXAMPLE 3

Employing the procedure and the equipment of Example 1, a series of acrylic acid-allyl methacrylate copolymers was made in polydimethylcyclosiloxanes such as Dow Corning® 244, Dow Corning® 344, Dow Corning® 245, Dow Corning® 345 and linear polydimethylsiloxanes such as 200® fluids. Dow Corning® 244 (D4) is octamethylcyclotetrasiloxane, b.p. 172° C. Dow Corning® 245 (D5) is decamethylcyclopentasiloxane, b.p. 205° C. Dow Corning® 344 is a mixture of D4/D5 90/10%, b.p. 178° C. Dow Corning® 345 is a mixture of D5/D6, b.p. 217° C., wherein D6 is dodecamethylcyclohexasiloxane. All are in the category of cyclomethicones. The 200®fluids are linear polydimethylsiloxanes (also known as dimethicones). Only two of them are volatile: the 200®fluid 0.65 cs, which is hexamethyldisiloxane (b.p. 100° C.) having the formula $(CH_3)_3SiOSi(CH_3)_3$; and 200® fluid 1.0 cs, which is octamethyltrisiloxane b.p. 152° C., has the formula $(CH_3)_3SiO(CH_3)_2SiOSi(CH_3)_3$. Other 200® fluids are non volatile with boiling points over 192° C. and their typical chemical composition is $(CH_3)_3SiO[SiO(CH_3)_2]$ $_x$Si(CH$_3$)$_3$(where x=1 to 2,500,000). In each instance, a viscosity over 40,000 cps was obtained for a 0.5% mucilage neutralized to pH 7 and measured at 1 RPM using ASTM E-2196.

EXAMPLE 4

Example 1 was repeated except that concentration of acrylic acid in the solvent was changed from 10% by weight to 8% by weight. The resulting polymer provided a viscosity of 178,000 cps at 0.5% by weight mucilage as measured on a Brookfield Viscometer using ASTM E-2196 at 1 RPM.

EXAMPLE 5

A number of polymers were produced in accordance with the typical process as it has been described in Example 1, except that different crosslinkers were employed. The viscosities of their respective 0.5% by weight mucilages were measured on a Brookfield viscometer using ASTM E-2196 at 1 RPM. The results are reported in Table II.

TABLE II

| CROSS-LINKER | | MUCILAGE VISCOSITY (cps) |
|---|---|---|
| Type | Mole % | 0.5% |
| ALA | 0.07 | 27,500 |
| DVB | 0.07 | 2,000 |
| BADMA | 0.07 | 300 |
| EGDMA | 0.07 | 300 |
| DVG | 0.07 | 300 |
| AMA | 0.01 | 11,500 |
| AMA | 0.03 | 72,000 |
| AMA | 0.05 | 95,400 |
| AMA | 0.07 | 143,000 |
| AMA | 0.09 | 109,000 |
| AMA | 0.11 | 39,000 |
| TMPTMA | 0.07 | 4,900 |
| TVS | 0.07 | 17,200 |
| APE | 0.02 | 128,000 |
| TMPDAE | 0.05 | 127,000 |

EXAMPLE 6

This example is set forth for purposes of comparison. Following the procedure of Example 1, polymerization was run substituting ethyl-acetate as the solvent in place of Dow Corning® 244. The copolymer that was produced in the ethyl acetate exhibited a viscosity of 103,000 cps viscosity at 0.5% by weight mucilage, whereas the copolymer of Example 1, that was identically produced but for being polymerized in a siloxane solvent, exhibited a viscosity of 143,000 cps (ASTM E-2196 at 1 RPM) at 0.5% by weight mucilage.

What is claimed is:

1. A process for increasing the viscosity of water, comprising:
   copolymerizing a carboxylic acid monomer selected from the group consisting of acrylic acid, neutralized acrylic acid, and mixtures thereof, and a polyfunctional cross-linker monomer in a mole ratio of about 1:0.03 to 1:0.10, respectively, in a silicone solvent, under an inert atmosphere, in the presence of an effective amount of an initiator to form a polymer; and adding an effective amount of said polymer to said water.

2. The process of claim 1 wherein the initiator is a member selected from the group consisting of a peroxide initiator and a redox initiator.

3. The process of claim 2 wherein the initiator is a redox initiator.

4. The process of claim 3 wherein the redox initiator includes a mixture of a peroxide and an azo compound.

5. The process of claim 4 wherein the peroxide is dibenzoyl peroxide and the azo compound is 2,2'-azobis (2,4-dimethylpentanenitrile).

6. The process of claim 3 wherein the carboxylic acid monomer is acrylic acid.

7. The process of claim 6 wherein the polyfunctional cross-linker is allyl methacrylate.

8. The process of claim 2 wherein the initiator is a peroxide initiator.

9. The process of claim 8 wherein the peroxide initiator is selected from the group consisting of t-butylperoctoate, dibenzoylperoxide, and lauroyl peroxide.

10. The process of claim 1 wherein the silicone solvent is a member selected from the group consisting of a cyclomethicone, a linear polydimethylsiloxane, a polymethylalkyl siloxane and a polyfluoroalkyl methyl siloxane.

11. The process of claim 2 wherein the silicone solvent is a cyclomethicone.

12. The process of claim 11 wherein the cyclomethicone is a member selected from the group consisting of octamethylcyclotetrasiloxane, decamethylcyclopentasiloxane, dodecamethylcyclohexasiloxane and mixtures thereof.

13. The process of claim 10 wherein the silicone solvent is a linear polydimethylsiloxane.

14. The process of claim 13 wherein the linear siloxane is a member selected from the group consisting of disiloxane, octamethyl trisiloxane, decamethyl tetrasiloxane, pentasiloxane, and mixtures thereof.

15. The process of claim 2 wherein a 0.5% by weight solution of the polymer in water has a viscosity of about 50,000 to 300,000.

16. The process of claim 15 wherein a 0.5% by weight of said polymer in water has viscosity of about 100,000 to 300,000 cps at.

17. The process of claim 15 wherein a 0.5% by weight solution of said polymer in water has a viscosity of about 200,000 to 250,000.

18. A process for viscosifying water comprising admixing water with an effective amount of viscosifying copolymer comprising a cross-linked carboxylic acid monomer selected from the group consisting of acrylic acid, neutralized acrylic acid, and mixtures thereof, and a polyvalent cross-linker monomer, wherein said carboxylic acid monomer and said polyfunctional cross-linker monomer are present at a mole ratio of 1:0.03 to 1:0.1, respectively, said viscosifying copolymer characterized in that a 0.5% by weight aqueous solution of said viscosifying copolymer has a viscosity of about 50,000 to 300,000 cps at 1 RPM.

19. The method of claim 18 wherein the carboxylic acid monomer is acrylic acid and said polyfunctional cross-linker monomer is allyl methacrylate and the mole ratio of said acrylic acid to said allyl methacrylate is 1:0.06 to 1:0.08.

20. The method of claim 19 wherein a 0.5% by weight aqueous solution of said viscosifying copolymer has a viscosity of about 100,000 to 300,000 cps.

21. The method of claim 20 wherein a 0.5% by weight aqueous solution of said viscosifying copolymer has a viscosity of about 200,000 to 300,000 cps.

22. A process for viscosifying water comprising admixing water with an effective amount of a water-viscosifying polymer, said polymer manufactured by a process comprising the steps of:

copolymerizing a partially neutralized acrylic acid monomer and a polyfunctional cross-linker monomer in a mole ratio of about 1:0.03 to 1:0.10, respectively, in a silicone solvent, under an inert atmosphere, in the presence of an effective amount of initiator to form said water-viscosifying polymer.

23. A process for viscosifying water comprising adding a viscosifying polymer to water, said polymer manufactured by a process comprising the steps of:

copolymerizing a neutralized acrylic acid monomer and a polyfunctional cross-linker monomer in a mole ratio of about 1:0.03 to 1:0.10, respectively, in a silicone solvent, under an inert atmosphere, in the presence of an effective amount of initiator to form said water-viscosifying polymer.

* * * * *